A. H. WELLINGTON.
Saw Gummer.
No. 33,913.
Patented Dec. 10, 1861.
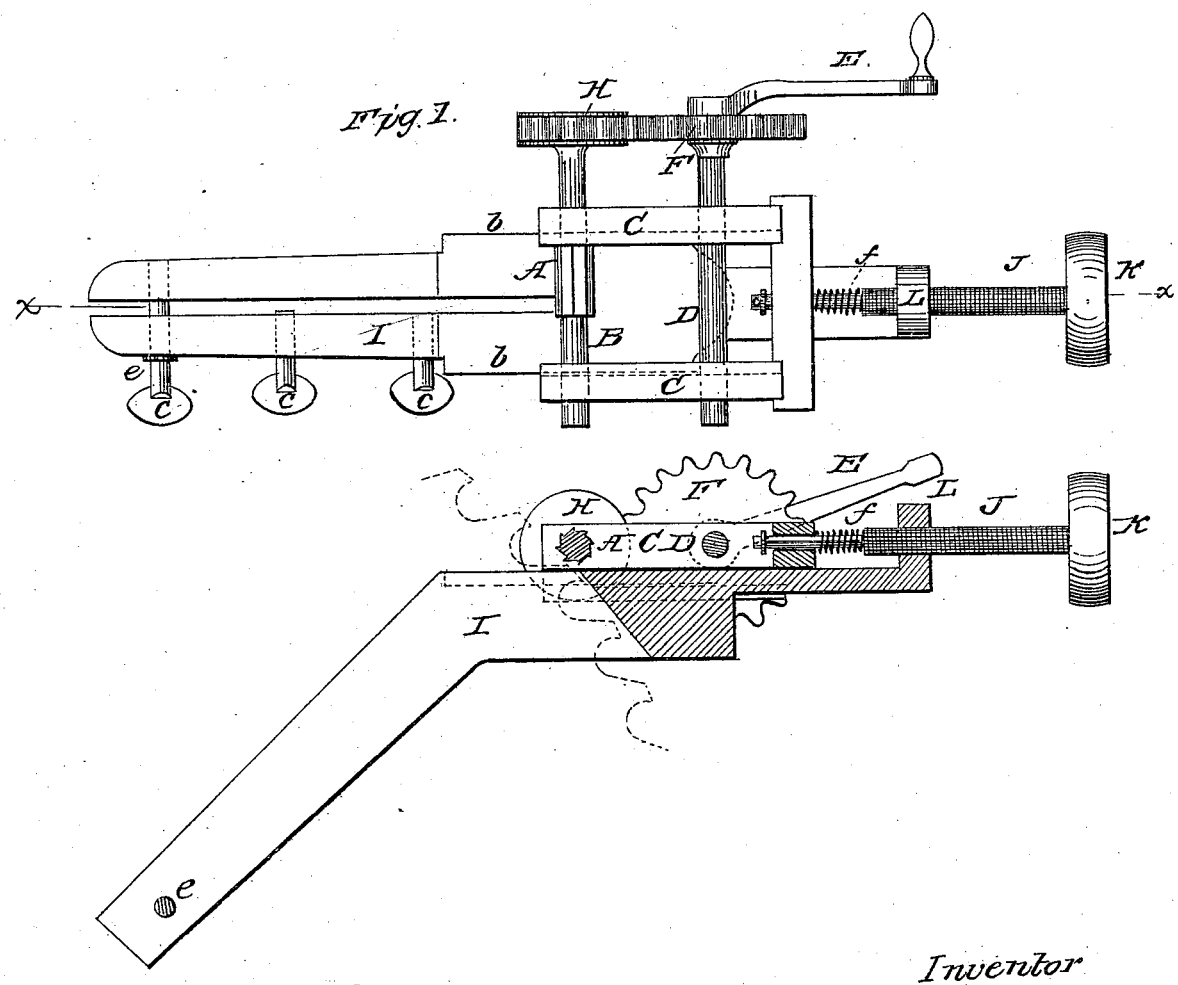

UNITED STATES PATENT OFFICE.

A. H. WELLINGTON, OF WOODSTOCK, VERMONT.

IMPROVEMENT IN SAW-GUMMERS.

Specification forming part of Letters Patent No. 33,913, dated December 10, 1861.

*To all whom it may concern:*

Be it known that I, A. H. WELLINGTON, of Woodstock, in the county of Windsor and State of Vermont, have invented a new and Improved Saw-Gummer; and I do hereby declare the following to be a full, clear, and exact description of the same, reference being had to the accompanying drawings, making a part of this specification, in which—

Figure 1 is a plan of my invention. Fig. 2 is a longitudinal section of the same, taken at the line $x\ x$.

Similar letters of reference indicate corresponding parts in the two figures.

This invention is designed for gumming circular saws, particularly large saws, such as are used for sawing lumber; and it consists in a simple construction and arrangement of parts, whereby the labor heretofore required for the same is greatly reduced and the gumming effected in an easy and expeditious manner.

To enable others skilled in the art to fully understand my invention, I will proceed to describe it.

A represents a burr-gummer, secured in the middle of a short shaft B, which is journaled on opposite sides of the burr in the sides of the carriage C, so as to have lateral as well as rotary movement. D is another shaft, also journaled in the carriage C, parallel with the former. On one end of this shaft is secured a crank E and a spur gear-wheel F, which latter meshes into a lantern-pinion wheel H on the shaft B, and thereby communicates motion from the crank to the burr-gummer. The carriage C is fitted and moved back and forth on guides $b\ b$, attached on opposite sides of the upper horizontal portion of the clamps I, by a screw J, which is furnished on its outer end with a hand-wheel K, and fitted to work through a bracket L, attached to the back end of the clamp. The front end of the clamp I projects downwardly from the horizontal portion at an angle of about forty-five degrees, and is provided near its lower end with a pivot-screw $e$, and between it and the top of the incline with two or more thumb set-screws $c\ c$, which latter pass laterally through only one of the jaws of the clamp and hold the saw between them and the opposite jaw. The screw J is turned down a short distance from the point to the size of the barrel, and a spiral spring $f$ placed thereon between the thread and front cross-piece of the carriage for the purpose of giving a yielding motion to the carriage and through it to the burr. The point of the screw after passing through the cross-piece is secured so as to revolve freely therein by a washer and pin.

The saw to be gummed being placed between the clamps, the pivot-screw is inserted through the eye thereof, and screwed into the jaw on the opposite side, bringing the two jaws toward each other and clamping the saw between them. The thumb set-screws are next screwed in against the face of the saw to further secure it and prevent any trembling, jarring, or springing of the same during the operation of gumming. A high velocity of speed being now given to the burr it is advanced with the carriage C by means of the screw J until the point of the saw-tooth on the upper side of the burr is brought immediately over the center of the burr, when the carriage and burr are retracted and the saw turned on its pivot a proper distance for another tooth, when a like operation is gone through with, as before. The burr-shaft having lateral movement in its bearings enables the operator to do the roughing out with one end of the burr and the finishing with the other, which can be kept sharp for that purpose. After the gums of the saw have all been cut out the saw is removed from the clamp finished and the tool is ready for another.

It is evident that the above tool is equally as well adapted for gumming reciprocating as circular saws. When used for straight saws, the clamps are placed on the blade of the saw in a horizontal position, with the pivot-screw at the back edge. The guides being at an angle of about forty-five degrees from the clamps, give the proper shape to the tooth.

Having thus described my invention, what I claim herein as new, and desire to secure by Letters Patent, is—

The carriage C, laterally-sliding shafts B D, burr A, screw J, and spiral spring $f$, with the clamps I and pivot-screw $e$, when combined, arranged, and operating in the manner described.

A. H. WELLINGTON.

Witnesses:
 WM. H. WELLINGTON,
 N. T. CHURCHILL.